United States Patent
Baughman et al.

(10) Patent No.: US 11,275,994 B2
(45) Date of Patent: Mar. 15, 2022

(54) UNSTRUCTURED KEY DEFINITIONS FOR OPTIMAL PERFORMANCE

(71) Applicant: International Business Machines Corporation, Armonk, NY (US)

(72) Inventors: Aaron K. Baughman, Silver Spring, MD (US); Stephen C. Hammer, Marietta, GA (US); John C. Newell, Austin, TX (US); Craig M. Trim, Sylmar, CA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 971 days.

(21) Appl. No.: 15/601,647

(22) Filed: May 22, 2017

(65) Prior Publication Data
US 2018/0336459 A1    Nov. 22, 2018

(51) Int. Cl.
| | | |
|---|---|---|
| *G06N 3/08* | (2006.01) | |
| *G06N 3/04* | (2006.01) | |
| *G06N 5/02* | (2006.01) | |
| *G06F 40/30* | (2020.01) | |
| *G06F 40/56* | (2020.01) | |
| *G06F 40/151* | (2020.01) | |
| *G06F 40/169* | (2020.01) | |
| *G06F 40/216* | (2020.01) | |

(52) U.S. Cl.
CPC ............. *G06N 3/08* (2013.01); *G06F 40/151* (2020.01); *G06F 40/169* (2020.01); *G06F 40/216* (2020.01); *G06F 40/30* (2020.01); *G06F 40/56* (2020.01); *G06N 3/0445* (2013.01); *G06N 5/025* (2013.01)

(58) Field of Classification Search
CPC .................................. G06N 3/08; G06F 40/56
See application file for complete search history.

(56) References Cited

U.S. PATENT DOCUMENTS

| | | |
|---|---|---|
| 8,793,201 B1 | 7/2014 | Wang et al. |
| 2014/0250032 A1* | 9/2014 | Huang .................... G06N 20/00 706/12 |
| 2015/0254555 A1 | 9/2015 | Williams, Jr. et al. |

(Continued)

OTHER PUBLICATIONS

Zhao, Rui, and Kezhi Mao. "Topic-aware deep compositional models for sentence classification." IEEE/ACM Transactions on Audio, Speech, and Language Processing 25.2 (2016): 248-260. (Year: 2016).*

Craven, Mark W., and Jude W. Shavlik. "Using neural networks for data mining." Future generation computer systems 13.2-3 (1997): 211-229. (Year: 1997).*

(Continued)

*Primary Examiner* — Kevin W Figueroa
(74) *Attorney, Agent, or Firm* — Anthony V. England; George S. Blasiak; Heslin Rothenberg Farley & Mesiti PC

(57) ABSTRACT

Methods, computer program products, and systems are presented. The method computer program products, and systems can include, for instance: running a comment examining process for processing comments of one or more user to provide a comment processing output; applying data of a dataset as training data for training a neural network to define a trained neural network, wherein the training data includes input node training data and output node training data; and generating a decision rule for the dataset based on a transfer function of the trained neural network, wherein the decision rule is based on the comment processing output.

21 Claims, 10 Drawing Sheets

(56) References Cited

U.S. PATENT DOCUMENTS

| | | | |
|---|---|---|---|
| 2016/0203498 A1* | 7/2016 | Das | H04L 67/02 |
| | | | 705/7.29 |
| 2018/0174051 A1* | 6/2018 | Knittel | G06N 3/04 |

OTHER PUBLICATIONS

M. Sipko, "Machine Learning for the Prediction of Professional Tennis Matches," http://www.doc.ic.ac.uk; Jun. 15, 2015.

J. Wang, et al. "Beyond Monte Carlo Tree Search: Playing Go with Deep Alternative Neural Network and Long-Term Evaluation," IDM, http://219.223.223.150/ldm; 2017.

C. Cheng, et al. "Rough-Set Rule Indication to Build Fuzzy Time Series Model in Forecasting Stock Price," 12$^{th}$ International Conference on Fuzzy Systems and Knowledge Discovery, (2015).

D. Robinson, "Understanding the Beta Distribution (using baseball statistics)," http://varianceexplained.org/statistics/beta_distribution_and_baseball/, Dec. 20, 2011.

Y. Chait, et al. "Control-Relevant Erythropoiesis Modeling in End-Stage Renal Disease." IEEE Transactions on Biomedical Engineering, vol. 61, No. 3, Mar. 2014.

A.Rule, "Visualizing Computer Activity to Support the Resumption of Long-Term Creative Work," http://dx.doi.org/10.1145/2757226.2764772, Jun. 22, 2015.

F. Korn, et al. "Quantifiable Mining Using Ratio Rules," The VLDB Journal, 8: 254-266, Nov. 1, 1999.

* cited by examiner

UNSTRUCTURED KEY DEFINITIONS FOR OPTIMAL PERFORMANCE

BACKGROUND

Data records in a database may be processed by a rule evaluation engine applying data rules to determine data records that have column or field values that deviate from the values that are expected by the rules. In the current art, the user manually codes data rules by first analyzing the data visually or using a profiling tool to obtain an understanding of the pattern of a well-formed record. Next a user builds logical expressions that define a set of rules to describe the normal characteristics of records in the set. These rules are then repeatedly executed against data sets to flag records that fail the conditions specified by the data rules and report on trends in failure rates over time.

A user may use a rule editor user interface to create new data rules or modify existing rules. Rules may be expressed in a rule language, such as BASIC or the Structured Query Language (SQL). The user may then save rules in a rule repository in the rule language or in a common rule format. The user may then select rules from the rule repository and a data set of records to provide to the rule evaluation engine to execute the selected rules against the selected data records to validate the data, capture the results and display the results to the user.

Developing data rules can require a significant amount of user time, effort and skill to analyze patterns in data, especially for large data sets having millions of records with hundreds of columns. For this reason, a data user typically does not develop and deploy rules until after bad data records result in recognizable business problems or setbacks. Because of this, data rules are often defined reactively after a problem is experienced and may be tailored to address the last experienced problem instead of future problems that may arise with the data records.

SUMMARY

Shortcomings of the prior art are overcome, and additional advantages are provided, through the provision, in one aspect, of a method. The method can include, for example running a comment examining process for processing comments of one or more user to provide a comment processing output; applying data of a dataset as training data for training a neural network to define a trained neural network, wherein the training data includes input node training data and output node training data; and generating a decision rule for the dataset based on a transfer function of the trained neural network, wherein the decision rule is based on the comment processing output.

In another aspect, a computer program product can be provided. The computer program product can include a computer readable storage medium readable by one or more processing unit and storing instructions for execution by one or more processor for performing a method. The method can include, for example running a comment examining process for processing comments of one or more user to provide a comment processing output; applying data of a dataset as training data for training a neural network to define a trained neural network, wherein the training data includes input node training data and output node training data; and generating a decision rule for the dataset based on a transfer function of the trained neural network, wherein the decision rule is based on the comment processing output.

In a further aspect, a system can be provided. The system can include, for example a memory. In addition, the system can include one or more processor in communication with the memory. Further, the system can include program instructions executable by the one or more processor via the memory to perform a method. The method can include, for example running a comment examining process for processing comments of one or more user to provide a comment processing output; applying data of a dataset as training data for training a neural network to define a trained neural network, wherein the training data includes input node training data and output node training data; and generating a decision rule for the dataset based on a transfer function of the trained neural network, wherein the decision rule is based on the comment processing output.

In another aspect a method can be provided. The method can include, for example running a comment examining process for processing comments of one or more user to provide a comment processing output; configuring a neural network based on the comment processing output, wherein training data for training the neural network to define a trained neural network includes input node training data and output node training data; and predicting a result of an event using the trained neural network.

In another aspect, a computer program product can be provided. The computer program product can include a computer readable storage medium readable by one or more processing unit and storing instructions for execution by one or more processor for performing a method. The method can include, for example running a comment examining process for processing comments of one or more user to provide a comment processing output; configuring a neural network based on the comment processing output, wherein training data for training the neural network to define a trained neural network includes input node training data and output node training data; and predicting a result of an event using the trained neural network.

In a further aspect, a system can be provided. The system can include, for example a memory. In addition, the system can include one or more processor in communication with the memory. Further, the system can include program instructions executable by the one or more processor via the memory to perform a method. The method can include, for example running a comment examining process for processing comments of one or more user to provide a comment processing output; configuring a neural network based on the comment processing output, wherein training data for training the neural network to define a trained neural network includes input node training data and output node training data; and predicting a result of an event using the trained neural network.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
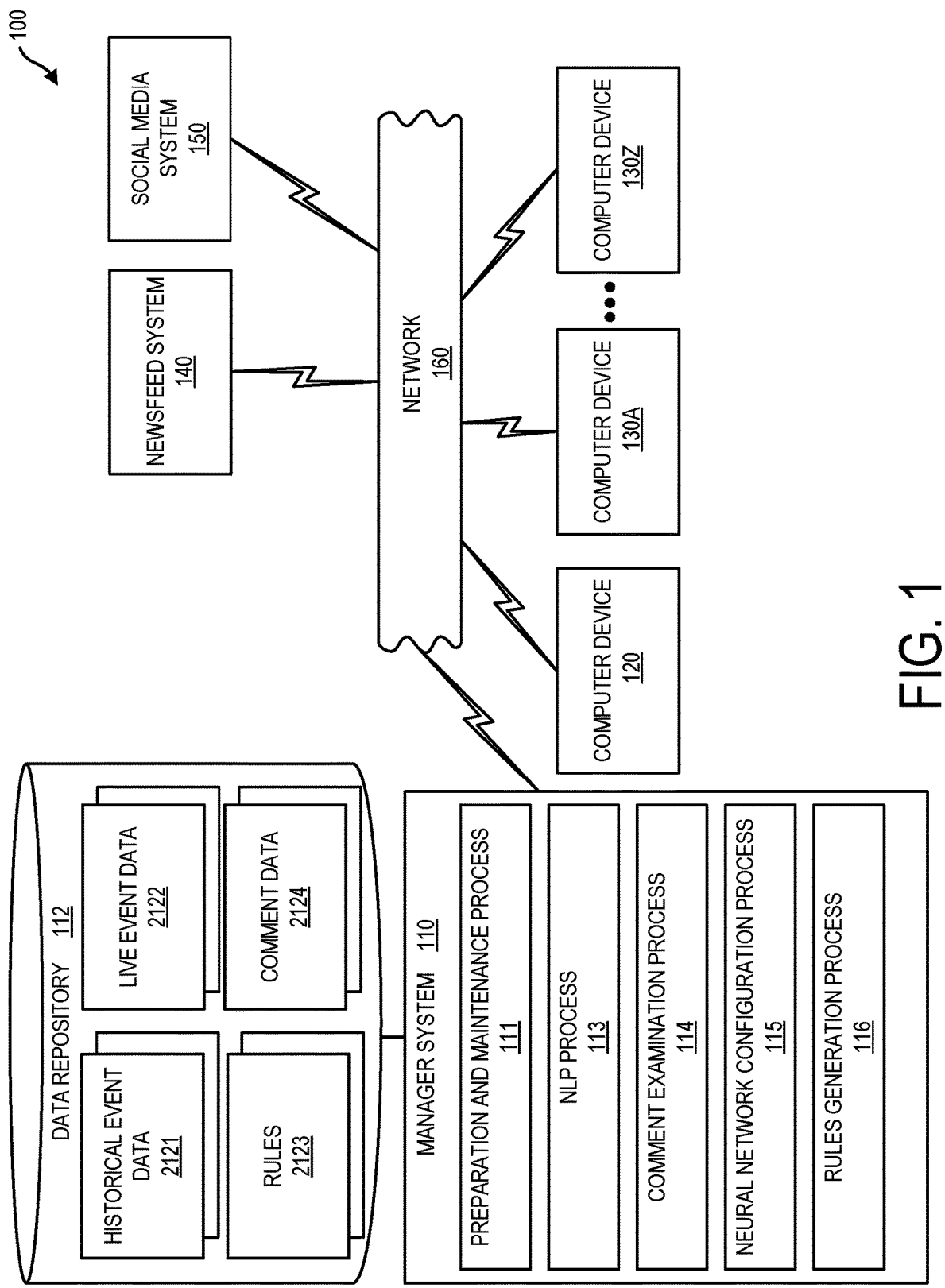
FIG. 1 depicts a system having manager system and a social media system in one embodiment.

A system 100 for use in rules generation is shown in FIG. 1. System 100 can include a manager system 110 having an associated data repository 112, one or more user computer device 120 for use by an administrator user of system 100, user computer devices 130A-130Z for use by non-administrator users of system 100, newsfeed system 140, and social media system 150. Manager system 110, computer device 120, computer devices 130A-130Z, newsfeed system 140, and social media system 150 can be in communication with one another via network 160. For example, network 160 may be a physical network or a virtual network. A physical network can be, for example, a physical telecommunications network connecting numerous computer nodes or systems, such as computer servers and computer clients. By contrast a virtual network can, for example, combine numerous physical networks or parts thereof into a logical virtual network. In another example, numerous virtual networks can be defined over a single physical network.

Data repository 112 can store various data e.g. in historical event data area 2121, data repository 112 can store various sets of historical event data. In live event area 2122, data repository 112 can store live event data, and in rules area 2123, data repository 112 can store a plurality of different rules. Data repository 112 can include comment data area 2124. Rules of rules area 2123 can be iteratively updated by manager system 110. Rules area 2123 can store configured neural networks used for rule generation and/or for performing predicting. For iteratively updating rules, manager system 110 can use data of historical event data area 2121 as well as live event data area 2122.

Manager system 110 can include preparation and maintenance process 111, natural language processing (NLP) process 113, comment examination process 114, neural network configuration process 115, and rules generation process 116. Manager system 110 can run preparation and maintenance process 111 to populate, prepare, and maintain data in data repository 112 for use by other processes e.g. comment examination process 114, neural network configuration process 115, and rules generation process 116. Manager system 110 can run NLP process 113 to process structured data into unstructured form. Manager system 110 can run NLP process 113 to process e.g. data from newsfeed system 140 and social media system 150, as well as from administrator computer device 120 and user computer devices 130A-130Z to classify content of received message data for input into data repository 112.

Manager system 110 can run comment examination process 114 to examine comments by users of system 100 regarding an event e.g. a sporting event such as a live sporting event, a promotional campaign, a political campaign, an industrial process. Manager system 110 can run comment examination process 114 to determine attributes of comments made regarding an event by users of system 100. Manager system 110 running comment examination process 114 can provide a comment processing output. A comment processing output can be provided e.g. by a crowdsourced output, e.g. information that specifies one or more topic of interest of an aggregate of users. A comment processing output can be provided e.g. by user profile information, e.g. information that specifies one or more topic of interest of a certain user. In one embodiment, manager system 110 can adapt a decision rule for use by a certain user based the certain user's user profile information.

Manager system 110 can run neural network configuration process 115 to iteratively configure a neural network. Configuration of a neural network can include e.g. applying training data to the neural network, establishing a number of input nodes to a neural network, establishing input node parameters for input nodes of a neural network.

Manager system 110 can run rules generation process 116 for generating rules for use by users of system 100 and/or for use by automated processes of system 100. Manager system 110 can run rules generation process 116. Running of rules generation process 116 can include querying of a neural network generated by neural network configuration process 115 for determining a transfer function of a neural network. Manager system 110 can run rules generation process 116 to query a neural network to determine one or more characteristics of a transfer function of a neural network and then can generate one or more decision rule based on the one or more characteristic.

Manager system 110 can run NLP process 113 to process data for preparation of records that are stored in data repository 112 and for other purposes manager system 110 can run a Natural Language Processing (NLP) process 113 for determining one or more NLP output parameter of a message. NLP process 113 can include one or more of a topic classification process that determines topics of messages and output one or more topic NLP output parameter, a sentiment analysis process which determines sentiment parameter for a message, e.g. polar sentiment NLP output parameters, "negative," "positive," and/or non-polar NLP output sentiment parameters, e.g. "anger," "disgust," "fear," "joy," and/or "sadness" or other classification process for output of one or more other NLP output parameters e.g. one of more "social tendency" NLP output parameter or one or more "writing style" NLP output parameter.

By running of NLP process 113 manager system 110 can perform a number of processes including one or more of (a) topic classification and output of one or more topic NLP output parameter for a received message (b) sentiment classification and output of one or more sentiment NLP output parameter for a received message or (c) part of speech tagging to determine a part of speech classification of each word in a text string, (d) name entity recognition (NER) to classify text as relating to people or places, or (e) other NLP classifications and output of one or more other NLP output parameter for the received message. Topic analysis for topic classification and output of NLP output parameter can include topic segmentation to identify several topics within a message. Topic analysis can apply a variety of technologies e.g. one or more of hidden mark model (HMM), artificial chains, passage similarities using word co-occurrence, topic modeling, or clustering. Sentiment analysis for sentiment classification and output of one or more sentiment NLP parameter can determine the attitude of a speaker or a writer with respect to some topic or the overall contextual polarity of a document. The attitude may be the author's judgment or evaluation, affective state (that is to say, the emotional state of the author when writing), or the intended emotional communication (that is to say, the emotional effect the author wishes to have on the reader). In one embodiment sentiment analysis can classify the polarity of a given text at the document, sentence, or feature/aspect level including whether the expressed opinion in a document, a sentence or an entity feature/aspect is positive, negative, or neutral. Advanced sentiment classification can classify beyond a polarity of a given text. Advanced sentiment classification can classify emotional states as sentiment classifications. Sentiment classifications can include the classification of "anger," "disgust," "fear," "joy," and "sadness."

NLP process 113 can run a speech to text process to convert voice samples to text based messages. Output messages output from a speech to text process can be input into text classifiers of NLP process such as the topic, sentiment, and/or part of speech classifiers as set forth herein. Accordingly, NLP process 113 can be configured to process voice based messages and/or text based messages. NLP process 113 can be configured to process live voice based messages such as by broadcasters of an event and/or live text based messages.

Figure 2:
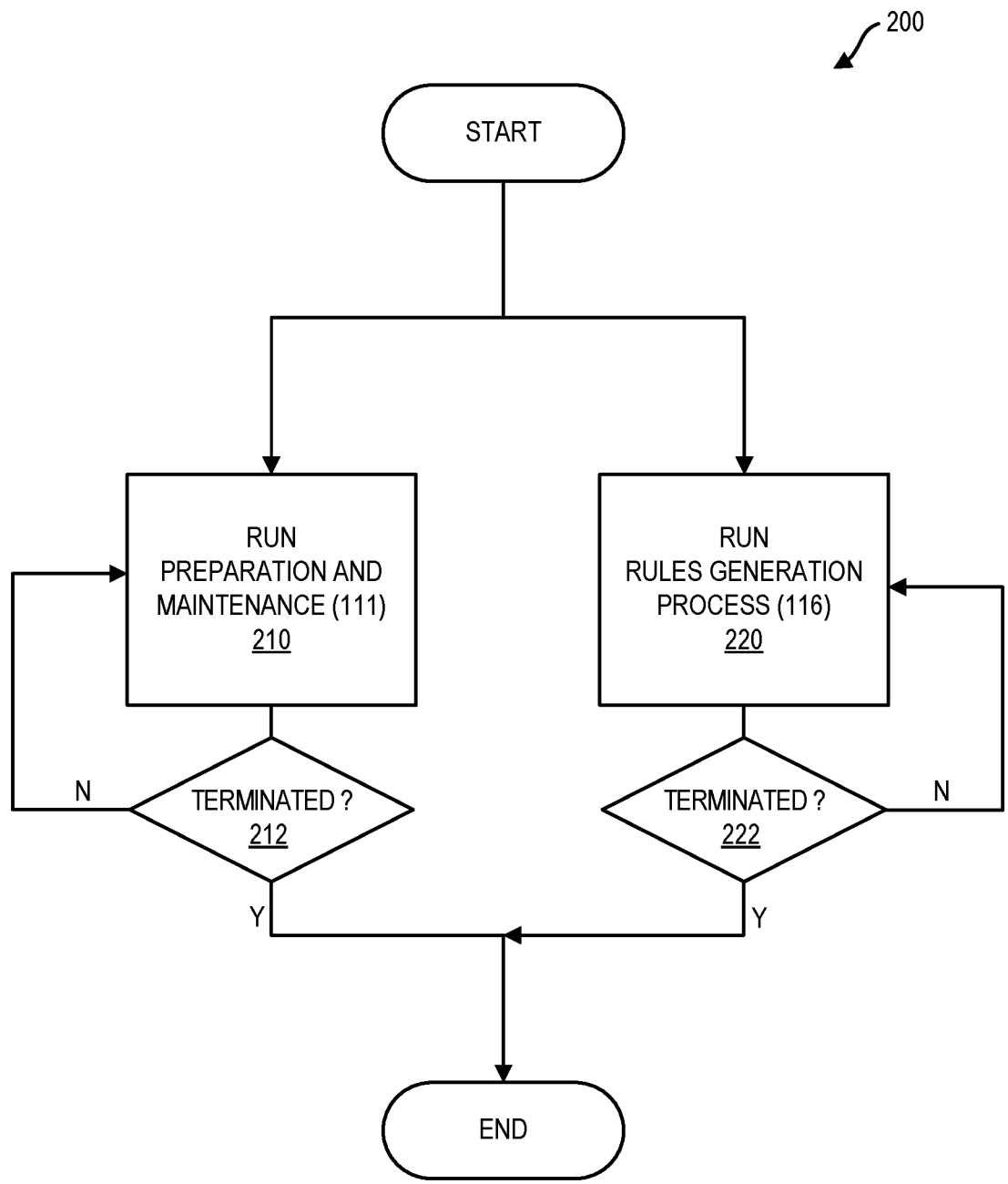
FIG. 2 is flowchart illustrating a coordination process performed by a manager system in one embodiment.

FIG. 2 is a flowchart illustrating a method 200 that can be performed by manager system 110. At block 210, manager system 110 can run preparation and maintenance process 111 to populate, prepare, and maintain various data of data repository 112 including data of historical event data area 2121 and live event data area 2122. Manager system 110 can periodically replicate data of live event data area 2122 into historical event data area 2121. Manager system 110 can run preparation and maintenance process 111 until process 111 is terminated at block 212. At block 220, manager system 110 can run rule generation process 116 to generate rules. Manager system 110 can run rule generation process 116 until rule generation process 116 is terminated at block 222. Running of rule generation process 116 can include using iteratively configured neural networks configured via running of neural network configuration process 115.

For performance of preparation and maintenance process 111, manager system 110 can be configured to automatically process messages that are generated by one or more data source e.g. newsfeed system 140 which can provide data on a live event e.g. live sporting event and/or social media system 150, computer device 120 and/or computer devices 130A-130Z. Manager system 110 can receive messages e.g. from newsfeed system 140, social media system 150, computer device 120, and/or computer devices 130A-130Z, and process such messages for output for providing structured data for storage in live event data area 2122 and comment data area 2124. Manager system 110, running preparation and maintenance process 111 can periodically replicate data of live event data area 2122 into historical event data area 2121. Manager system 110 can structure records of live event data area 2122 and can structure data records of historical event data area 2121. As part of structuring data for use by historical event data area 2121, manager system 110 can vectorize records. By vectorizing data records, data records can be adapted for processes such as application of deep learning processes to perform neural network analysis of such data records.

Figure 3:
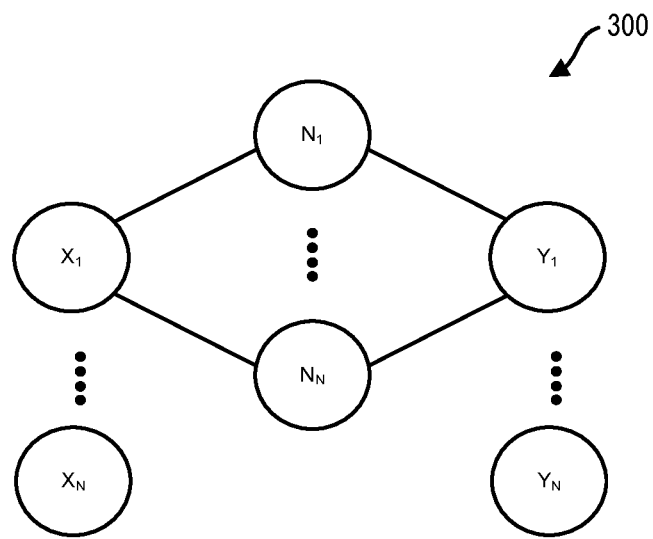
FIG. 3 depicts a neural network in one embodiment.

FIG. 3 illustrates a depiction of a neural network 300. Neural network 300 can include one or more input node $X_1$-$X_n$, one or more hidden node $H_1$-$H_n$, and one or more output node $Y_1$-$Y_n$, there can be one or more layer of hidden nodes $H_1$-$H_n$. Manager system 110 can train neural network 300 by applying input training data to input nodes $X_1$-$X_n$ and results data to output nodes $Y_1$-$Y_n$.

Neural network 300 can include a transfer function that is iteratively adjusted by the application of training data. Neural network 300 can be implement as a recurrent neural network. A recurrent neural network (RNN) is a class of artificial neural network where connections between units form a directed cycle. This creates an internal state of the network which allows it to exhibit dynamic temporal behavior. Unlike feedforward neural networks, RNNs can use their internal memory to process arbitrary sequences of inputs. In one embodiment, neural network 300 can be implemented using long short-term memory (LSTM) architecture. An LSTM based neural network can classify, process and predict time series when there are time lags of unknown size and bound between important events. Neural network 300 in one embodiment can include residual link functionality. Residual link functionality allows selected edges (links) of neural network 300 to be selectively activated or deactivated when neural network 300 is used to produce an output for providing a prediction and/or for rule generation.

Figure 4:
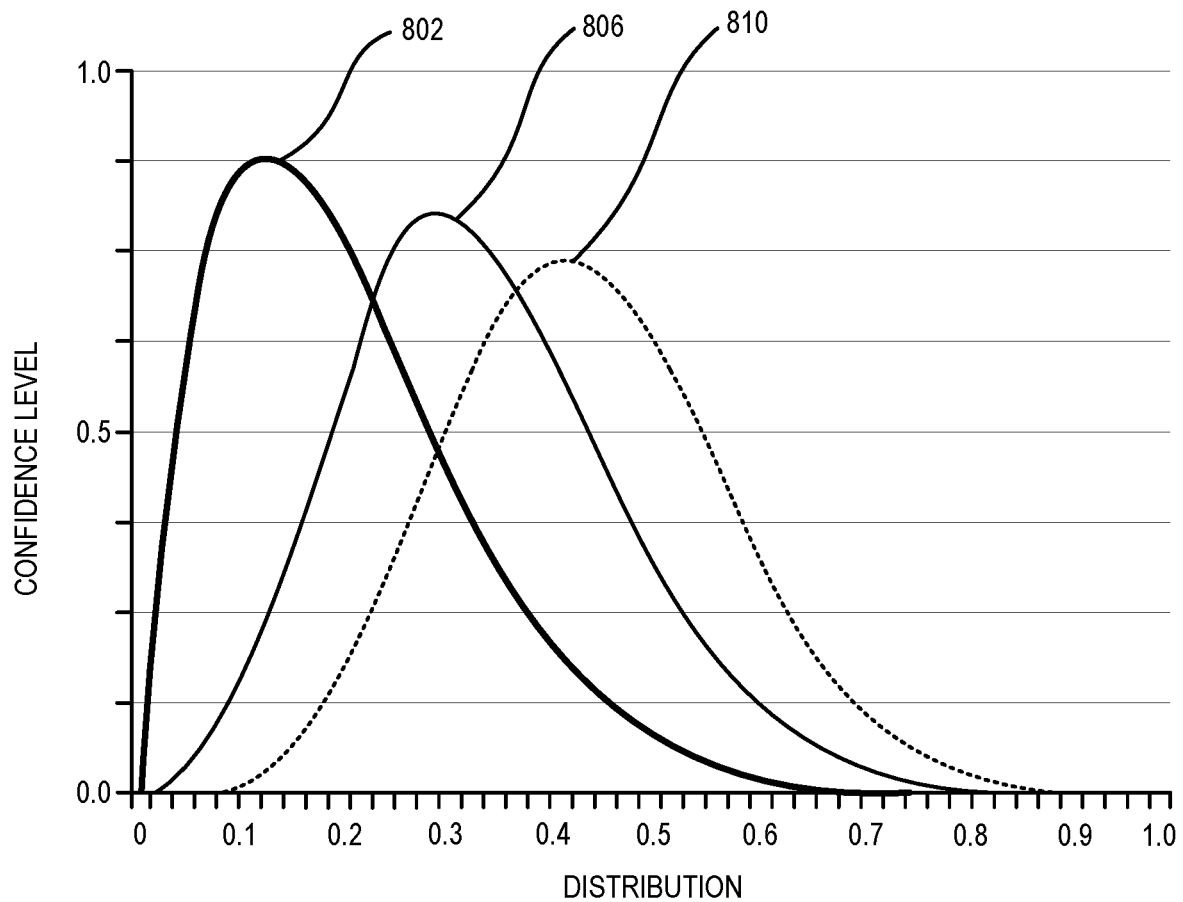
FIG. 4 is a chart illustrating confidence level distributions for different classifications of users in one embodiment.

In one embodiment, neural network 300 can be configured based on a comment processing output, e.g. a crowdsourced output provided by comment examination process 114. A crowdsourced output can be e.g. information that specifies one or more topic of interest to an aggregate of users, e.g. a prioritized list of comment topics. In providing a crowdsourced output, manager system 110 can weight contributions of various users based on a reliability distribution of various users in different user classifications. Embodiments herein recognize that different classifications of users can be expected to have different levels of expertise knowledge and ability to predict. Referring to FIG. 4, distribution 802 indicates a confidence level distribution for users providing comment data in a first classification of users, distribution 806 is a confidence level distribution for users of a second classification of users, and distribution 810 is a confidence level distribution for users providing comment data in a third classification of users. A confidence level referred to in connection with FIG. 4 can represent the level of confidence level that user in the classifications provides a comment relevant to event outcome. Embodiments herein recognize that expert classified users can be expected to make comments of greater value for performance of rules generation and/or predicting than non-expert classified users. Embodiments herein leverage the perception of multiple users in configuring a neural network for performing a predicting relating to a live event e.g. a sporting event, a promotional campaign, a political campaign, an industrial process.

Figure 5:
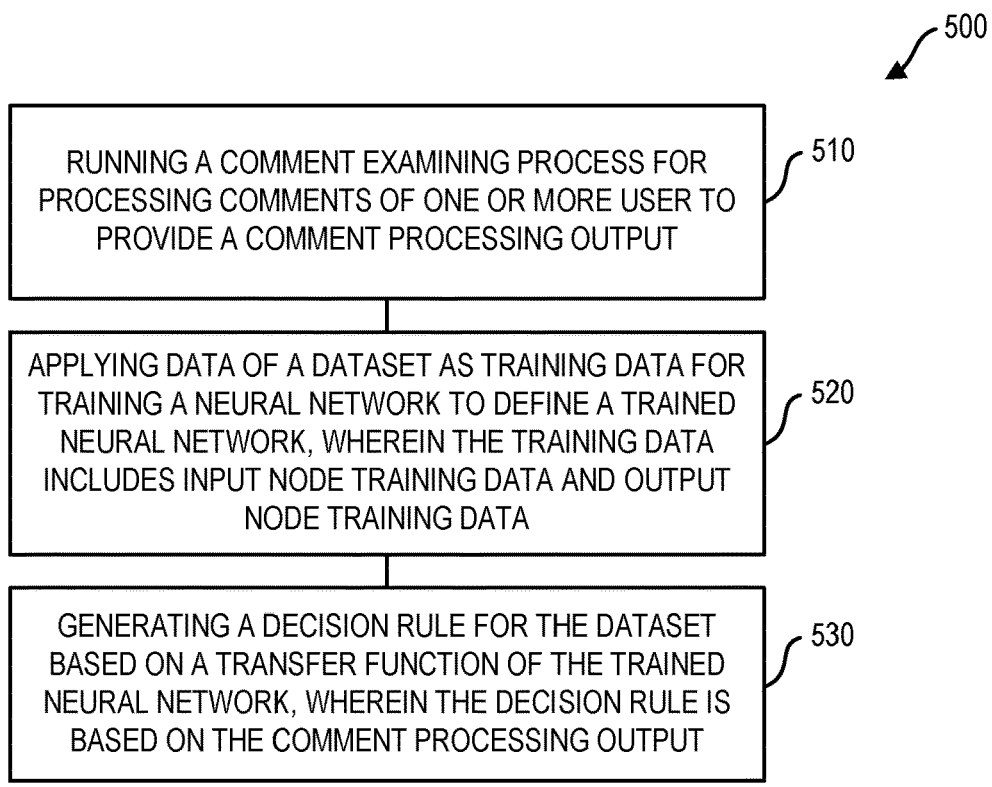
FIG. 5 is a flowchart depicting a method according to one embodiment.

FIG. 5 is a flowchart illustrating a method 500 that can be performed by manager system 110 in one embodiment. At block 510 manager system 110 can perform running a comment examining process for processing comments of one or more user to provide a comment processing output. At block 520 manager system 110 can perform applying data of a dataset as training data for training a neural network to define a trained neural network, wherein the training data includes input node training data and output node training data. At block 530 manager system 110 can perform generating a decision rule for the dataset based on a transfer function of the trained neural network, wherein the decision rule is based on the comment processing output. For example at block 510 in one embodiment manager system 110 can process data of comment data area 2124 of data repository 112 received from e.g. newsfeed system 140, social media system 150, computer device 120, and/or computer devices 130A-130Z. For example, at block 520 in one embodiment manager system 110 can train a neural network 300 using data of data repository 112, e.g. data stored in historical event data area 2121 and/or live event data area 2122. For generating a decision rule at block 530, manager system 110 in one embodiment can query the trained neural network that has been subject to training by training data. For generating a decision rule, manager system 110 in one embodiment can query a neural network with a spread of data values to determine a characteristic of a transfer function and based on the transfer function, can establish a decision rule.

Figure 6:
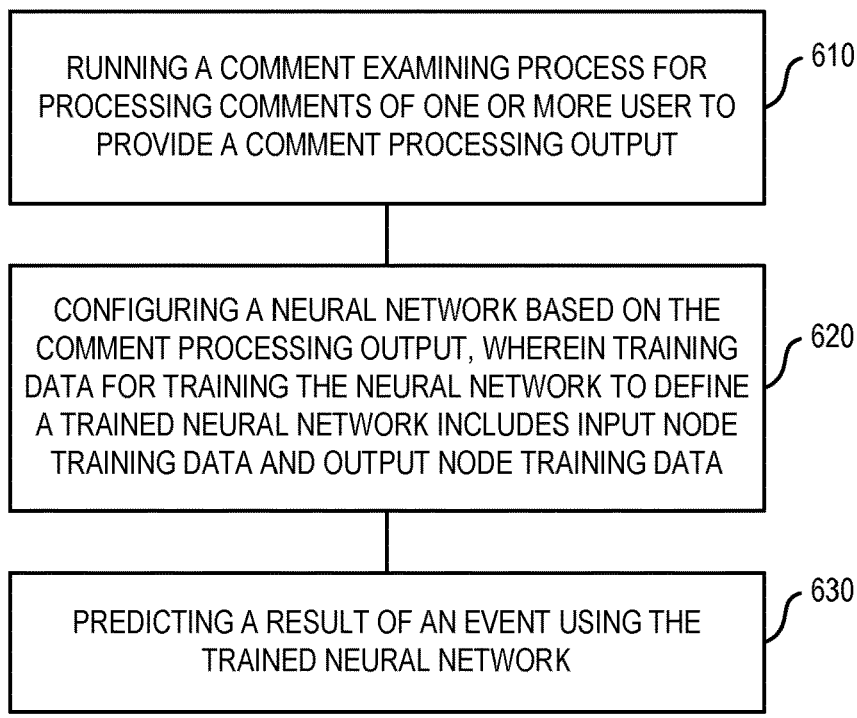
FIG. 6 is a flowchart depicting a method according to one embodiment.

FIG. 6 illustrates a method 600 that can be performed on manager system 110 in one embodiment. At block 610 manager system 110 can perform running a comment examining process for processing comments of one or more user to provide a comment processing output. At block 620 manager system 110 can perform configuring a neural network based on the comment processing output, wherein training data for training the neural network to define a trained neural network includes input node training data and output node training data. At block 630 manager system 110 can perform predicting a result of an event using the trained neural network. For example at block 610 in one embodiment manager system 110 can process data of comment data area 2124 of data repository 112 received from e.g. newsfeed system 140, social media system 150, computer device 120, and/or computer devices 130A-130Z. At block 620 in one embodiment manager system 110 can configure a neural network 300 based on one or more output of comment examination process 114. At block 620 in one embodiment manager system 110 can use a comment processing output, e.g. a crowdsourced output determined based on running of comment examination process 114 for configuring a neural network 300. At block 620 in one embodiment manager system 110 can apply training data to input nodes of neural network 300 based on one or more classifier determined based on running of comment examination process 114. At block 630 in one embodiment manager system 110 can perform predicting a result of an event using neural network 300 in a trained state.

Figure 7:
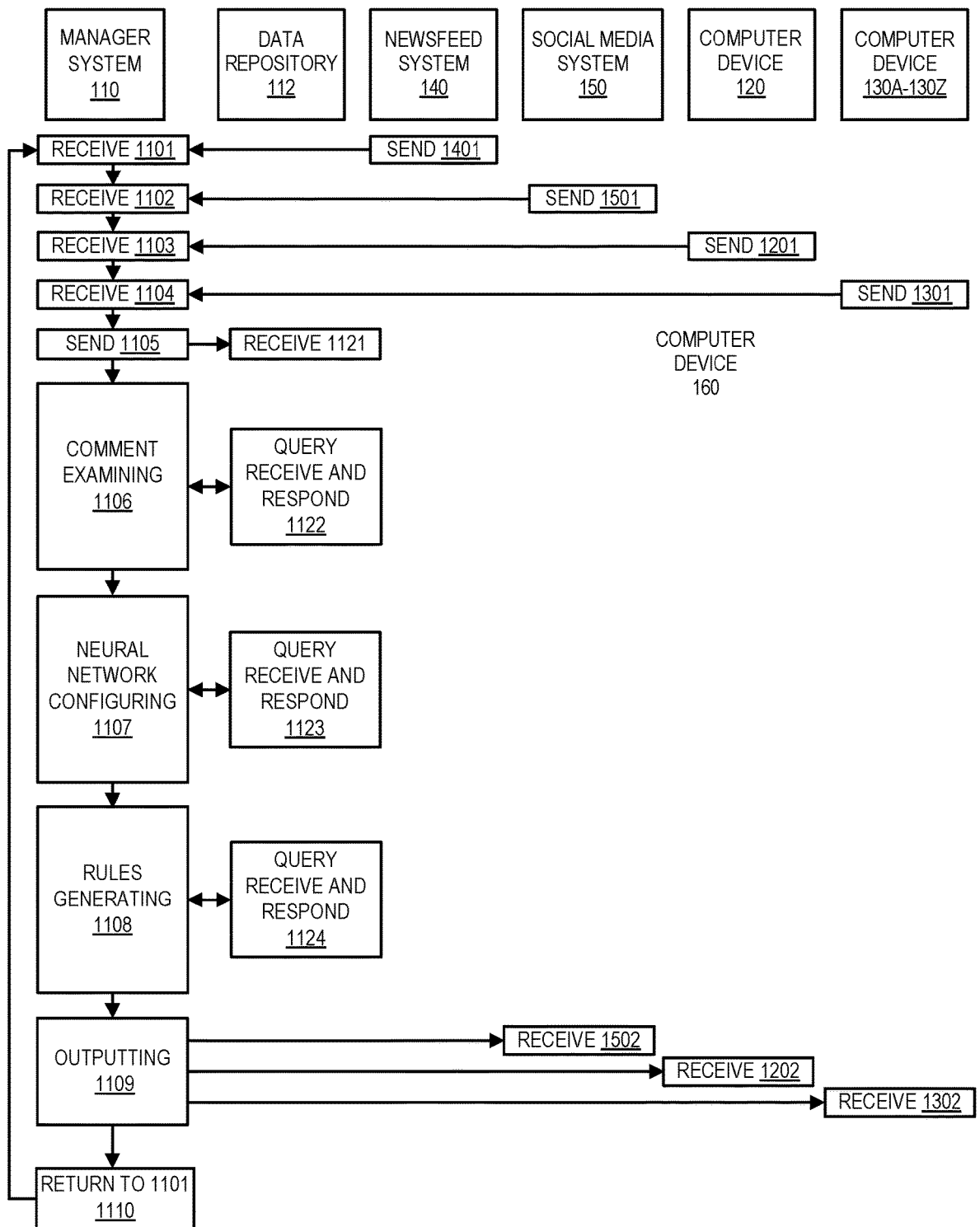
FIG. 7 is a flowchart depicting a method according to one embodiment.

FIG. 7 illustrates performance of method 500 and method 600 in one embodiment. According to the method depicted in FIG. 7 described from the perspective of manager system 110 and its associated data repository 112, newsfeed system 140, social media system 150, administrator computer device 120, and user computer devices 130A-130Z. At blocks 1201, 1301, 1401, and 1501 newsfeed system 140, social media system 150, administrator computer device 120, and user computer devices 130A-130Z can respectively send data e.g. statistical data and/or comment data to manager system 110 for receipt by manager system 110 at blocks 1101, 1102, 1103, and 1104 respectively. Manager system 110 responsively to receipt of such data, can send the data at block 1105 to data repository 112 for receipt by data repository 112 at block 1121 e.g. for storage into live event data area 2122 which data can be replicated into historical event data areas 2121 and/or comment data area 2124.

Comment data received by data repository 112 at block 1121 can be stored in comment data area 2124 which can include a live comment section and a historical comment section. Comment data area 2124 can store records of comments of users of system 100. Comment data records can be tagged with user information and so manager system 110 can examine comments data for establishing a user profile for a user of system 100. For the receipt of data and inputting of data into data repository 112, manager system 110 can run preparation and maintenance process 111 and NLP process 113 in a manner set forth herein so that stored data of data repository 112 is populated, prepared (e.g. can be structured including by tagging), and maintained for use by various other processes such as comment examination process 114, neural network configuration process 115, and rules generation process 116.

At block 1106, manager system 110 can perform examining comments from comment data area 2124 as received from external sources such as newsfeed system 140 and social media system 150 and/or computer devices 120, 130A-130Z. Comment data can include e.g. news reports of newsfeed system 140, user posting on social media system 150 (e.g. via user interface 1600), broadcaster or analyst comments of a broadcast platform, e.g. provided by social media system 150 or another platform. For performing examining manager system 110 can run comment examination process 114. Examining performed at block 1106 and can include multiple queries of data repository 112 as indicated by query receive and respond block 1122 performed by data repository 112.

Examining at block 1106 can include examining records of comment data area 2124 of data repository 112. Examining can include examining of records of message data to ascertain comments made relevant to an event e.g. a live sporting event in one example. To determine whether a comment has been made relevant an event, manager system 110 can examine various NLP output classifiers such as topic classifiers and sentiment classifiers. For example, in the case of a sporting event manager system 110 can determine that a record pertains to a comment for an event where a first topic tag specifies the event, and a second topic tag specifies an attribute of a player e.g. "High Shots," or "Fast Running". Examining a sentiment classifier for a record e.g. "positive" and/or "joy" can provide additional confidence that a record includes a comment on an event. In one embodiment manager system 110 can employ various scoring functions to prioritize comments e.g. to provide a crowdsourced output indicating topics of interest to an aggregate of users, e.g. a prioritized list of comment topics. Scoring functions can include e.g. a number of users making a commonly classified comment e.g. several users noting a high shot or fast running and can include weights based on reputations of users associated to the various comments.

Referring to FIG. 4, distribution 802 indicates a confidence level distribution for users providing comment data in a first classification (e.g. coaches), distribution 806 is a confidence level distribution for users of a second classification (e.g. former players), and distribution 810 is a confidence level distribution for users providing comment data classified as other users (e.g. who are not coaches or former players). For outputting a prioritized list of comment topics manager system 110 can weight contributions of various users based on the confidence level distribution of their user classification. Manager system 110, as set forth herein, can then use the determined priority and can base a configuration of a neural network on the determined priority.

Manager system 110 at block 1107 can perform configuring of a neural network e.g. neural network 300. Configuring neural network 300 can include e.g. establishing a number of input nodes of a neural network, establishing input node parameters and/or applying training data into an instantiated neural network 300. In one embodiment, manager system 110 at configuring blocks 1106 can configure a neural network based on one or more result of an examining of user comments set forth with respect to block 1106.

Configuring a neural network 300 at block 1107 can include multiple queries of data repository 112 as indicated by query receive and respond block 1123 performed by data repository 112. Manager system 110 can use a determined priority list of comment topics output by an examining at block 1106. For performing configuring at block 1107 manager system 110 can reference a prioritization list of comment classifiers and can perform configuring based on the prioritization. Embodiments herein leverage the perception of multiple users in configuring a neural network for performing a predicting relating to a live event e.g. a sporting event, a promotional campaign, a political campaign, an industrial process. In one embodiment, manager system 110 for performing neural network configuring at block 1107 can reference a result of a comment examining at block 1106, and can determine that a comment subject classifier has just received a qualifying score. Based on such referencing manager system 110 at block 1107 can configure a neural network 300 as shown in FIG. 3 corresponding to certain subject matter comment classifier. In practice, multiple users of system 100 can be observing an event and can be posting messages on social media relating to the event. Manager system 110 can be examining data records of such comments and as comments determined to be highly relevant to the event are observed can instantiate new neural networks relating to the comments. Configuring of a neural network at block 1107 can include training of a neural network 300. Training a neural network 300 can include use of historical event data and can perform training using data of live event data area 2122. In one embodiment, in the training of a neural network 300 manager system 110 can weigh live event data more heavily than historical event data. On completion of a neural network configuring at block 1107, manager system 110 can proceed to block 1108. At block 1108, manager system 110 can perform rules generating. From time to time, various sources of system 100 can request rule generation.

Figure 8:
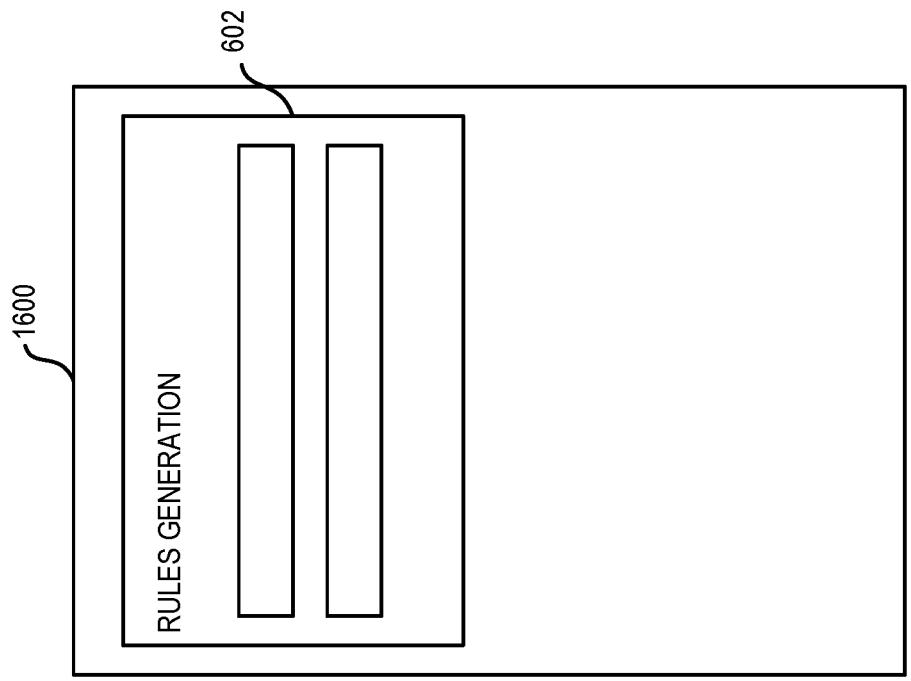
FIG. 8 depicts an administrator user interface according to one embodiment.
Figure 9:
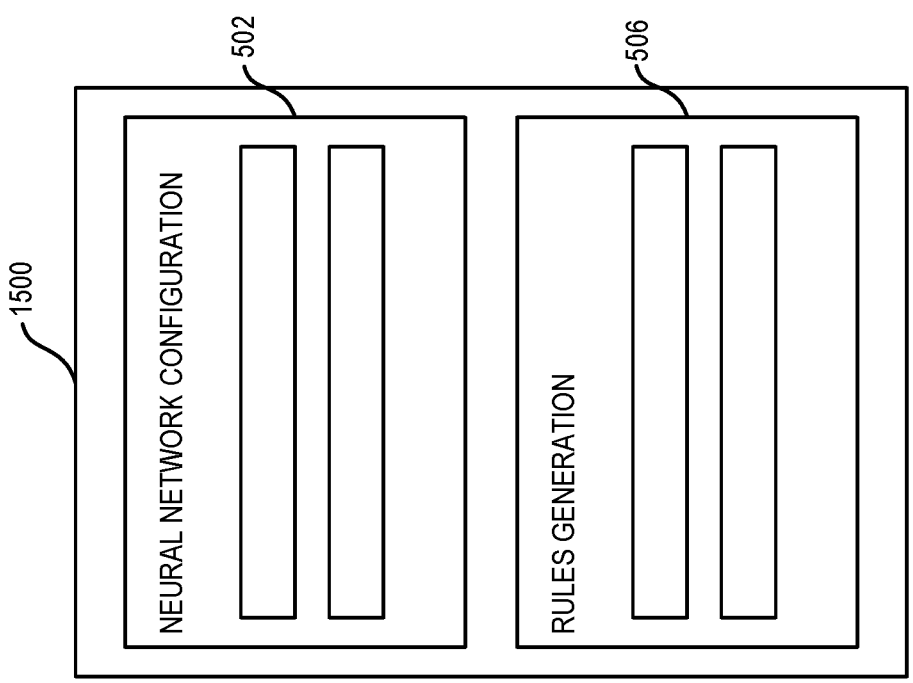
FIG. 9 depicts a user interface according to one embodiment.

FIG. 8, illustrates a user interface 1500 that can be displayed on a display of an administrator computer device 120. User interface 1500 can be used for defining various aspects of a neural network configuration e.g. specifying neural network libraries, restrictions. Using area 502 an administrator user can define persistent structure of a neural network, e.g. number of input nodes, type (LSTM or other), output nodes, number of hidden layers, number and location of residual links. An administrator user can use area 506 for defining rules generation requests. FIG. 9 illustrates a user interface 1600 that can be displayed on a display of a computer device 130A-130Z which can be a computer device used by non-administrator user. Computer devices 130A-130Z may be computer devices e.g. viewers of a sporting event, each of which can be running an application for supporting viewing of an event. From time to time, such users may be inclined to initiate generation of a rule and can use area 602 of user interface 1600 to define decision rules generating requests. Manager system 110 can examine comment data of users of computer devices 130A-130Z to determine user profile information of the respective users and can automatically generate rules requests for the users based on the respective user profiles. Rules request defining data from computer devices 120 and 130A-130Z can be sent respectively at blocks 1201 and 1301.

At block 1108, manager system 110 for performing generating a rule can run rules generation process 116 as set forth herein. For generating a rule, manager system 110 at block 1108 can run queries of neural network 300 as currently configured according to configuring block 1107. By querying neural network 300 manager system 110 at block 1108 can return a characteristic of a transfer function of neural network 300. Performance at block 1108 can include multiple queries of data repository 112 as indicated by query receive and respond block 1124 performed by data repository 112.

Manager system 110 can then use the characteristic to determine a decision rule. In addition to or alternatively to receiving defined rule generation requests defined using a user interface, such as user interface 1500 or user interface 1600, system 100 can be operative to automatically generate rules requests. For example, manager system 110 can run various live process and can be configured to automatically generate and initiate rules generation requests. Neural network 300 can be iteratively updated and rules generated via querying of neural network 300 can also be iteratively updated. As the iterative updating is responsive to live comments of users, rules generation can likewise be responsive to live updates by users.

In one embodiment, social media system 150 or another platform broadcasting an event can automatically initiate rules requests. In one embodiment, social media system 150 can initiate rules requests based on the previously described crowdsourced output provided by a prioritization list prioritizing comment subject matter classifications. Thus, if users commenting on an event note "high shots" of a particular player, a social media system 150 configured as a broadcast platform that broadcasts an event e.g. via live video feed e.g. social media system 150 can make a request for generation of a decision rule relating to high shots (e.g. how high should shots be). Manager system 110 can query neural network 300 for generating an applicable rule, and the broadcast platform can display data using the generated rule.

At block 1110, manager system 110 can return to block 1101 to perform a next iteration of receiving data from various sources at blocks 1101-1104, inputting structured data into data repository 112 at block 1105, examining social media comments at blocks 1106, configuring neural network 300 at block 1107, and performing rules generation and outputting processes at block 1108. At block 1109, manager system 110 can output one or more rule in response to rule generation requests e.g. to social media system 150, administrator computer device 120, and applicable user computer devices 130A-130Z.

Example 1

Figure 10:
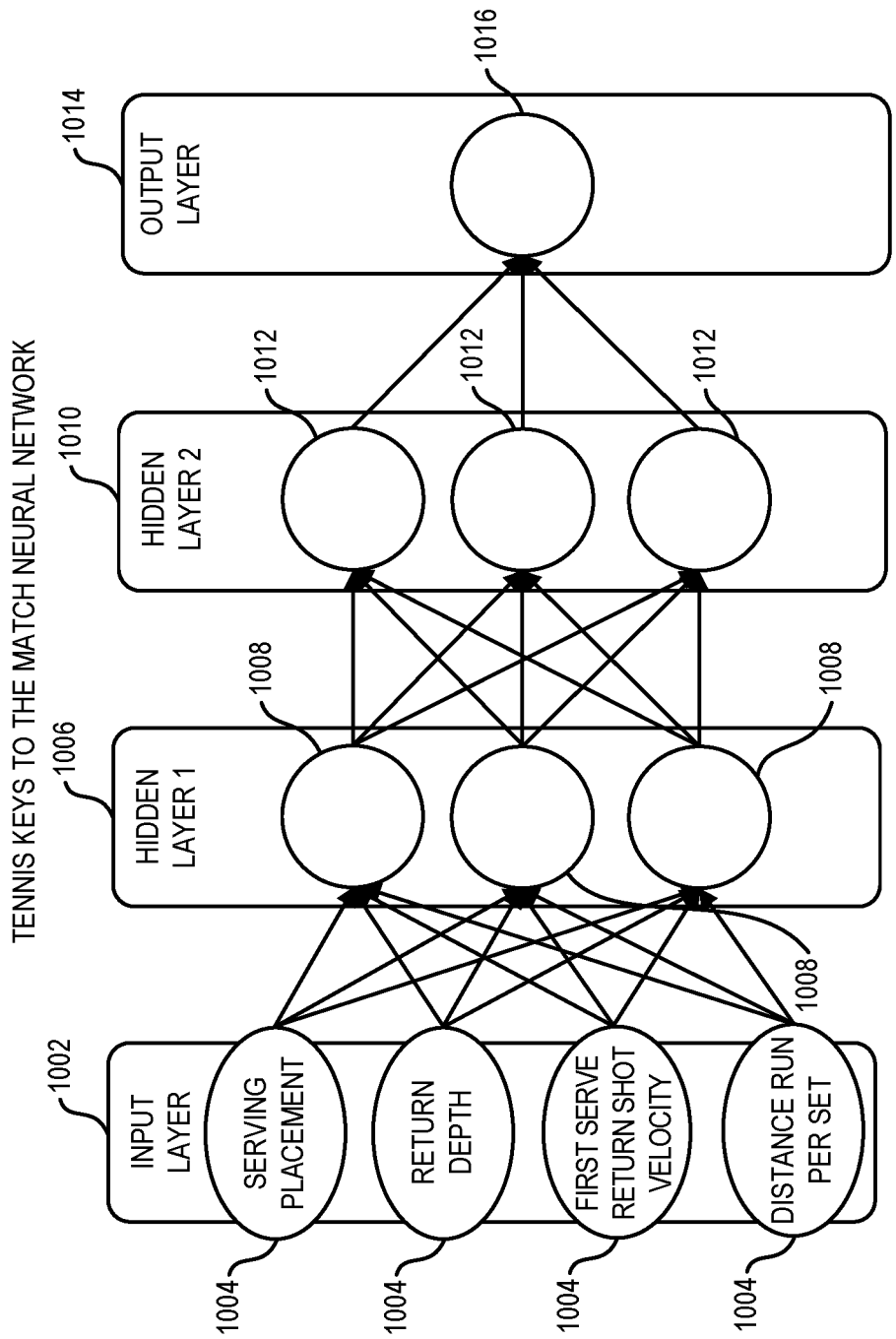
FIG. 10 depicts a neural network in one embodiment.

Further details are set forth in reference to FIG. 10 describing a specific embodiment in which a method according to in reference to FIG. 7 is used to provide predictions on a tennis match and to generate decision rules relating to playing tennis. Data can be received at block 1101-1105 to populate data repository 112 on prior tennis matches between players. Data received at blocks 1101-1105 can include "keys to the match" data summarized in Table A.

TABLE A

| Key | Description | Type |
|---|---|---|
| Distance Run Per Set | Player's total distance covered in a set. | Volley |
| Opponent Distance Run Per Set | Player's opponent's total distance covered in a set. | Volley |
| Distance Ratio | The ratio between distance a player covers in a set and distance their opponent covers in a set. | Volley |
| Return Depth | The average distance a player's return shot lands from the baseline during a set. | Volley |
| Opponent Return Depth | The average distance a player's opponent's return show lands from the baseline during a set. | Volley |
| Return Depth Ratio | The ratio between a player's average return depth and their opponent's average return depth. | Volley |
| Serving Placement | The percentage of first serves that a player hits close to either the center line, sideline, or body. | Serve |
| First Serve Spread | The spread or variance of first serve targets, weighted towards center vs wide serves. | Serve |
| Kick Height | The average 'kick' or bounce height of a player's second serves in a set. | Serve |
| Return Baseline Proximity | A player's average proximity to the baseline at contact during rally phases of a point in returning games. | Serve |
| Pace of Play | The average time a player takes between points during their serve. | Serve |
| Serve Baseline Proximity | A player's average proximity to the baseline at contact during rally phases of a point in serving games. | Serve |
| Passing Shot Velocity | The average speed of shots from and down the line. | Return |
| Drop Shot Depth | The average distance past the net that a player's drop shots land. | Return |
| First Serve Return Velocity | The average speed of return shots from an opponent's first serve. | Return |
| Second Serve Return Velocity | The average speed of return shots from an opponent's second serve. | Return |

At block 1106 manager system 110 can perform comment examining and can run comment examination process 114. Examining can include examining of comment data of data repository 112 (comment data area 2124). Comment data can include e.g. news reports of newsfeed system 140, user posting on social media system 150, broadcaster or analyst comments of a broadcast platform, e.g. provided by social media system 150 or another platform and/or data received from computer devices e.g. computer device 120, and/or computer devices 130A-130Z. In one embodiment, for performing comment examining manager system 110 can classify comments according to topics and can match those topics to topics that are specified to keys of "keys to a match". For performing matching manager system 110 can employ one or more pattern recognition process, e.g. employing classification algorithms and/or clustering algorithms. At block 1106 manager system 110 in one embodiment can output a crowdsourced output that specifies one or more topic of interest of an aggregate of users, e.g. in the form of a prioritized list of comment topics. Manager system 110 can establish a prioritized list of comment topics of interest to an aggregate of users. In one example manager system 110 can output a prioritized list of comment topics as set forth in Table B.

TABLE B

| Rank | Key | Description | Type | Score |
|---|---|---|---|---|
| 1 | Serving Placement | The percentage of first serves that a player hits close to either the center line, sideline, or body. | Serve | 90 |
| 2 | Return Depth | The average distance a player's return shot lands from the baseline during a set. | Volley | 85 |
| 3 | First Serve Return Velocity | The average speed of return shots from an opponent's first serve. | Return | 61 |
| 4 | Distance Run Per Set | Player's total distance covered in a set. | Volley | 55 |
| 5 | Kick Height | The average 'kick' or bounce height of a player's second serves in a set. | Serve | 54 |
| 6 | Return Baseline Proximity | A player's average proximity to the baseline at contact during rally phases of a point in returning games. | Serve | 49 |

Referring to Table B, manager system 110 running comment examination process 114 can provide a crowdsourced output including a prioritized list of topics of interest to an aggregate of users. Table B presents a list of prioritized topics of interest of an aggregate of users wherein the topics are matched to topics of "keys to the match data".

At block 1107 manager system 110 can configure a neural network. In one embodiment, during an initial pass through block 1107 configuring a neural network 300 can include instantiating and training a neural network 300. During subsequent passes through block 1107 a structure of neural network 300 can remain unchanged or can be changed (re-instantiated). Where a structure of neural network 300 remains unchanged a configuring of neural network 300 can include further training a previously instantiated and trained neural network 300 with new training data.

During an initial pass through block 1107 a neural network 300 can be instantiated. A structure of neural network 300, e.g. number of input nodes, input node parameters, type, number of hidden layers, can be based on configuration data e.g. defined by an administrator using administrator user interface 1500 (FIG. 8). In the embodiment of FIG. 10 an exemplary four input node neural network is instantiated. The input nodes 1004 of neural network 300 can have associated input node parameters. The exemplary neural network 300 as shown in FIG. 10 can include an input layer 1002 having input nodes 1004, a first hidden layer 1006 having hidden layer nodes 1008 a second hidden layer 1010 having hidden layer nodes 1012 and an output layer 1014 having output node 1016. Edges can connect the nodes as shown and can be configured as residual links that can be selectively activated and deactivated. The input node parameters can be selected from the candidate set of match keys (Table A). Manager system 110 can select the input node parameters from the candidate set of keys Table A based on a crowdsourced output that can be output at block 1107. In the current example, the crowdsourced output can be a prioritized list of comment topics as set forth in Table B. Embodiments herein leverage the perception of multiple users in configuring a neural network for performing a predicting relating to a live event e.g. a sporting event. In one embodiment the neural network 300 as shown in FIG. 10 can have a predetermined number of input nodes defined based on administrator user defined data defined using user interface 1500 (FIG. 8). In another embodiment, the number of input nodes can be based on a provided crowdsourced output. For example, the topics of the list of prioritized list of comment topics as set forth in Table B can have associated relevancy scores, e.g. based on number of data records associated to the topic. Manager system 110 can be configured so that a neural network input node for a comment topic is established based on a relevancy score satisfying a threshold. Referring to the illustrative data of Table B manager system 110 in one embodiment can be configured to establish a neural network for each comment topic having a relevancy score satisfying a relevancy score threshold of 50 or greater. Thus, in the described illustrative example, where manager system 110 establishes a variable number of input nodes depending on a number of comment topic scores exceeding a threshold of 50, a neural network can be established having 5 input nodes. Manager system 110 e.g. based on administrator user defined configuration data can instantiate one or more output node that can be subject to training using results training data, and which can output results based on input data.

With input node parameters established manager system 110 during an initial pass through block 1107 can train neural network 300. For training, values for the respective input node parameters can be applied to input nodes 1004 of neural network 300 with results data applied to an output node 1016. The results data can include e.g. a winner of a match or a winner of set. Manager system 110 can correlate winner of a set data to winner of a match based e.g. on formula or table lookup.

With neural network 300 trained, neural network 300 can be used to generate decision rules. In decision theory, a decision rule is a function which maps an observation to an appropriate action. Decision rules generated using neural network 300 can be related to input node input parameters. For example, for the input node parameter of neural network 300 of FIG. 10 of "first serve return shot velocity" a rule generating process that generates a rule using neural network 300 can generate such decision rule e.g. as "player should increase first serve return shot velocity by 5 mph to optimize chance of winning the match". For using a neural network 300 to generate decision rules, manager system 110 can query neutral network 300 using datasets. Referring to FIG. 10 users at each different computer device 130A-130Z can run different instances of user interface 1600 to permit multiple different user-defined requests for rules from different users. Instances of user interface 1600 can be distributed to different users to allow different users to define different rule generation requests. In another aspect, manager system 110 can be configured so that different rules requests for different users can be generated automatically e.g. based on user profile data of data repository 112, e.g. user profile data based on user comment data of comment data area 2124.

Rules requests in one embodiment can be defined based on a crowdsourced output that specifies one or more topic of interest of an aggregate of user. For example the crowdsourced output of Table A can be used to establish input node parameters of neural network 300 and can also be used for establishing a rules generation process in which a neural network 300 which is trained is queried. In the foregoing example the highest scoring X topics can be used for selection of input node parameters and the highest scoring Y (Y<X, Y=/>1) topics can be used for rule generation. For example candidate decision rules can be associated to input node parameters of neural network 300. For generating a certain decision rule associated to a certain input node, manager system 110 for querying of neural network 300 can apply a dataset to a certain input node of the input nodes 1004 of neural network 300 for development of a threshold. In the described example, manager system 110 can use a crowdsourced output e.g. as shown in Table B for establishing X input nodes of a neural network 300, can train the neural network 300 to define a trained neural network and can use the crowdsourced output e.g. as shown in Table B for decision rule generation wherein according to a decision rule generating process a neural network 300 that has been trained can be queries. For querying of a neural network 300 in a trained state manager system 110 can applying datasets to Y of the X input nodes 1004 of the neural network 300.

Further referring to adapting rules generation for certain users, comments data area 2124 of data repository 112 can include user tags specifying the originator of the comment, and thus manager system 110 can examine user data of comment data area 2124 to provide a user profile for a user that specifies a prioritized list of comment topics of interest to a particular user. Manager system 110 can match a prioritized list of comment topics of interest to a particular user to a particular input node parameter of neural network using a matching criteria, and can generate a decision rule based on the match. For performing matching manager system 110 can employ one or more pattern recognition process, e.g. employing classification algorithms and/or clustering algorithms. Based on a matching process determining that a user has an interest in the first serve return shot velocity input node parameter manager system 110 can generate a decision rule based on the first serve return shot velocity input node parameter. Based on a matching process determining that a user has an interest in the distance run per set input node parameter manager system 110 can generate a decision rule based on the distance run per set parameter. Generated decision rules as set forth herein can be used by users of computer devices 130A-130Z who are spectators of a live event being broadcast. Generated decision rules as set forth herein can be used by users of computer devices 130A-130Z who are e.g. participants of an event or consultants (e.g. business or sports coaches) of a participant of an event which may or may not be subject to live broadcast.

Exemplary rules requests for the neural network 300 of FIG. 10 can be based on the input node parameters of the input nodes 1004 of neural network 300. A decision rule can have the form if condition 1 then outcome. Conditions can have data values and operators (e.g. greater than, less than, equal to).

A possible rule based on the first serve return shot velocity input node parameter is the rule "player will win if player has a return shot velocity of greater than 55 mph" which in the case the player has a current return shot velocity of 50 mph can be expressed as "player should increase first serve return shot velocity by 5 mph to optimize chance of winning the match". A possible rule based on the return depth from baseline input node parameter is the rule "player will win if player has a return depth from baseline of greater than 2 feet" which in the case the player has a current return depth of less than two feet can be expressed as the rule "player should increase the return depth from baseline to optimize chances of winning the match".

Manager system 110 can output a text based message specifying decision rule for display on a displayed user interface of a computer device e.g. user interface 1500 and/or user interface 1600. Manager system 110 can output a decision rule for process control e.g. machine process control. Manager system 110 can output a decision rule for process control e.g. machine process control e.g. robot machine control. Manager system 110 can output a decision rule for process e.g. machine process control e.g. a wearable athletic performance training aid which can prompt a player to take a specified action, e.g. increase return shot velocity. Output rules and/or predictive e.g. text based for display and/or formatted for process control can be output to various destinations e.g. social media system 150 for receipt by social media system 150 at block 1502, to computer device 120 for receipt by computer device 120 at block 1202, and/or to computer devices 130A-130Z for receipt by computer devices 130A-130Z at block 1302.

Generating a decision rule using a trained neural network 300 can include a variety of processes. In one embodiment, generating a decision rule can include querying neural network 300 in a trained state with sample data and examining result data. In one example, manager system 110 can run rules generating process 115 to generate a decision rule based on the certain one of the input nodes 1004 of the neural network 300 of FIG. 10, e.g. the first serve return shot velocity input node parameter. The certain input node can be selected e.g. based on (a) a crowdsourced output (e.g. as shown in Table B according to one example) indicating that a prioritized crowdsourced topic of interest matches the input node parameter, (b) that a user profile information matches the input node parameter or (c) that a user has manually entered data to request the rule using user interface 1500 or user interface 1600.

For generating a rule based on a certain input node parameter in one embodiment, manager system 110 can query neural network 300 in a trained state using a spread of values. The spread of values can include a range of valid values for the certain input node parameter and manager system 110 can apply the spread of values to the input node associated to the input node parameter. The spread of values can be provided by continuous data, e.g. data that can occupy any value over a continuous range, e.g. first serve return shot velocity of 0 mph to 200 in the described example. Manager system 110 can examine results associated with a query of neural network 300 for identifying a threshold value. For example based on applying a spread of input values e.g. sample data including first serve return shot velocities from 0 mph to 200 mph manager system 110 can monitor a result at an output node 1016 of a neural network 300 in a trained state that indicates a result, e.g., the winner of a set or match in the described example. Manager system 110 can identify the input value at which an output state transition is triggered as a threshold value. Manager system 110 can use the threshold value as a decision rule condition value and can use the order of the sample data to determine an operand (greater than, less than, equal to) associated to the decision rule. Manager system 110 can thus generate a decision rule for output, e.g. such as "player will win if player has a first serve return shot velocity of greater than 55 mph" in the described example.

In one embodiment, neural network 300 can be configured so that links (edges) of the neural network 300 are provided by residual links which can be activated or deactivated. Manager system 110 for querying neural network 300 using sample data provided by a spread of values can deactivate certain of the residual links to increase speed and focus a decision rule generation. The spread of values can be provided by continuous data, e.g. data that can occupy any value over a continuous range, e.g. first serve return shot velocity of 0 mph to 200 in the described example. In the described example, wherein manager system 110 generates a rule based on the first serve return shot velocity input node parameter manager system 110 for querying neural network 300 in a trained state for identification of a threshold can deactivate selected residual links in dependence on a relatedness of the selected residual links to the first serve return shot velocity input node parameter (with less related links being more likely to subject to deactivation). For deactivating residual links, manager system 110 in one embodiment can deactivate residual links to reduce or remove a contribution from input nodes other than the input node associated to the input node parameter for which a rule is being generated. For deactivating residual links, manager system 110 in one embodiment can deactivate residual links connected to input nodes other than the input node associated to the input node parameter for which a rule is being generated.

Manager system 110 for querying neural network 300 with sample data for rule generation can include in one embodiment manager system 110 extracting hidden weights from neural network 300 in a trained state (e.g. a set of deepest hidden weights), applying a spread of values using the extracted hidden weights to generate a set of output data; subjecting the set of output data to regression analysis to provide a regression function; and identifying a threshold and an operand using the regression function to provide a decision rule. In the described example involving extraction of hidden weights, manager system 110 can perform deactivating selected residual in dependence on a relatedness of the selected residual links to the input node parameter for which the rule is being generated (with less related links being more likely to be subject to deactivation). For deactivating residual links, manager system 110 in one embodiment can deactivate residual links to reduce or remove a contribution from input nodes other than the input node associated to the input node parameter for which a rule is being generated. For deactivating residual links, manager system 110 in one embodiment can deactivate residual links connected to input nodes other than the input node associated to the input node parameter for which a rule is being generated.

As noted manager system 110 for performance of decision rule generation can selectively deactivate residual links of neural network 300 based on an input node parameter associated to the decision rule being generated which input node parameter can be based on a comment processing output provided by running of comment examination process 114. Referring to Table B, a crowdsourced output can change and accordingly manager system 110 can be configured to dynamically change activated residual links based on the crowdsourced output. In addition or alternatively manager system 110 can selectively activate or deactivate residual links based on a user profile of a user which can be provided by processing performed using comment examination process 114.

Neural network 300 for use in predicting a result of an event and in generating decision rules can be configured iteratively over time. In the referenced example, new data on a tennis match can be expected to become available as a match proceeds. User comments in respect to a tennis match may also change. Users who provide changing comments can include users of computer devices 130A-130Z who can receive generated decision rules for presentment on their respective computer devices 130A-130Z. Table C illustrates iterative configurations of a neural network 300 e.g. through a series of passes through block.

TABLE C

| Iteration | Number of Input Nodes | Training Data | Rule Generation |
|---|---|---|---|
| 1 | 4 | New Training Data | Process A |
| 2 | 4 | New Training Data | Process B |
| ... | ... | ... | ... |
| N | 4 | New Training Data | Process C |
| N + 1 | 5 | New Training Data | Process D |
| N + 2 | 5 | New Training Data | |
| ... | ... | ... | ... |
| N + M | 5 | New Training Data | Process E |
| N + M + 1 | 3 | New Training Data | Process F |
| ... | ... | ... | ... |
| N + K | 3 | New Training Data | Process G |

Referring to Table C, manager system 110 can change the number of input nodes of neural network 300 over time through iterations and can change input node parameters (specifying the subject matter for the input node). At each iteration manager system 110 can apply new training data in one embodiment. Manager system 110 can change a process for decision rule generation at each iteration. For example, manager system 110 for decision rule generation can activate or deactivate residual links based on comment data of a certain user for whom a decision rule is adapted. Because comment data for the certain user can change through iterations processes for decision rule generation can adaptively change between iterations. In example described in Table C, the number of input nodes of neural network 300 can remain at 4 and can include the node input parameters as set forth in FIG. 10. At iteration N+1 the 4 input nodes of the earlier iterations with the input node parameters specified at FIG. 10 can remain and a new input node with a new input node parameter can be added (e.g. a crowdsourced output can indicated that Pace of Play has increased in importance to the public). At iteration N+M+1 two of the five input nodes can be subtracted (e.g. a crowdsourced output can indicated that Serving Placement and First Serve Return Shot Velocity have decreased importance to the public). It will be understood that neural network 300 can be scaled to fewer input nodes or a greater number of input nodes e.g. dozens, hundreds or thousands of input nodes.

Referring to the tennis match example of Example 1, iterations can be performed on a set by set basis. On completion of a prior set manager system 110 and commencement of a current set manager system 110 can receive new data at blocks 1101-1105 and can perform a next iteration of comment examining at block 1106 which can result in the list of Table B changing and user profile information changing (including users for whom decision rules may be adapted). On completion of a prior set and commencement of a current set manager system 110 can apply training data to input nodes and the one or more output node 1016 of neural network 300 based on the statistical data and result data of the prior set. On completion of a prior set manager system 110 and commencement of a current set manager system 110 can use neural network 300 in a trained state for performing rules generating at block 1108. On completion of a prior set and commencement of a current set manager system 110 can also use neural network 300 to provide a prediction as to the winner of the current set and match.

For using neural network 300 to provide a prediction manager system 110 can receive current set statistical data and can apply such current set data to neural network 300 in trained state and a prediction based on neural network 300 can be provided by an output of the output node 1016 of neural network 300 with the current data applied. Manager system 110 can send for display text based predictions for display on displayed user interfaces 1600 of users of computer devices 130A-130Z.

Manager system 110 can provide predictions that are adapted differently depending on the particular user. Manager system 110 can provide predictions that are adapted differently depending on a comment processing output provided by comment examination process 114. Manager system 110 can provide predictions that are adapted differently depending on user profile information provided by running of comment examination process 114. For example manager system 110 can determine that a topic of interest to first user using a first instance of user interface 1600 matches a first input node parameter of a first input node of neural network 300 and that a topic of interest to a second user using a second instance of user interface 1600 matches a second input node parameter of a second input node of neural network 300. Responsively, manager system 110 can output differently adapted predictions to the first and second users e.g. with different text based messages for display on the different instances of user interface 1600 specifying the predictions. For adaptively providing different predictions for sending to different destinations, manager system 110 can differently control neural network 300 for providing the different predictions.

For providing a prediction to the first user, manager system 110 can deactivate selected residual links of neural network 300 in dependence on a relatedness of the selected residual links to the first input node parameter with less related links being more likely to be subject to deactivation. Manager system 110 can deactivate selected residual links based on current data being input to neural network 300 for providing a prediction at an output node 1016 of neural network 300. For deactivating residual links, manager system 110 in one embodiment can deactivate residual links to reduce or remove a contribution from input nodes other than the first input node associated to the first input node parameter. For deactivating residual links, manager system 110 in one embodiment can deactivate residual links connected to input nodes other than the first input node.

For providing a prediction to the second user, manager system 110 can deactivate selected residual links of neural network 300 in dependence on a relatedness of the selected residual links to the second input node parameter with less related links being more likely to be subject to deactivation. Manager system 110 can deactivate selected residual links based on current data being input to neural network 300 for providing a prediction at an output node 1016 of neural network 300. For deactivating residual links, manager system 110 in one embodiment can deactivate residual links to reduce or remove a contribution from input nodes other than the second input node associated to the second input node parameter. For deactivating residual links, manager system 110 in one embodiment can deactivate residual links connected to input nodes other than the second input node.

Manager system 110 can dynamically change control of neural network 300 for providing predictions through iterations of configurations of neural network 300. Neural network 300 can have X (e.g. 4) input nodes 1004 and can dynamically change control of neural network 300 for providing predictions based on the order of the first Y topics of the Table B prioritized list, where Y<3. During a first iteration, a crowdsourced output e.g. as shown in Table B in one example can include a first ordering of a first set of topics matching a first set of input node parameters associated to a first set of input nodes of neural network 300 and during a second iteration a crowdsourced output e.g. as shown in Table B in one example can include a second ordering with a second set of topics matching a second set of input node parameters associated to a second set of input nodes of neural network 300, the second set of topics being different than the first set of topics.

For providing a prediction during the first iteration, manager system 110 can deactivate selected residual links of neural network 300 in dependence on a relatedness of the selected residual links to the first set of input node parameters (with less related links being more likely to be subject to deactivation). Manager system 110 can deactivate selected residual links based on current data being input to neural network 300 for providing a prediction at an output node 1016 of neural network 300. For deactivating residual links, manager system 110 in one embodiment can deactivate residual links to reduce or remove a contribution from input nodes other than the first set of input nodes. For deactivating residual links, manager system 110 in one embodiment can deactivate residual links connected to input nodes other than the first set of input nodes.

For providing a prediction during the second iteration, manager system 110 can deactivate selected residual links of neural network 300 in dependence on a relatedness of the selected residual links to the second set of input node parameters (with less related links being more likely to be subject to deactivation). Manager system 110 can deactivate selected residual links based on current data being input to neural network 300 for providing a prediction at an output node 1016 of neural network 300. For deactivating residual links, manager system 110 in one embodiment can deactivate residual links to reduce or remove a contribution from input nodes other than the second set of input nodes. For deactivating residual links, manager system 110 in one embodiment can deactivate residual links connected to input nodes other than the second set of input nodes.

End of Example 1

Certain embodiments herein may offer various technical computing advantages, involving computing advantages to address problems arising in the realm of computer networks such as problems involving generation of data rules can require a significant amount of user time, effort and skill to analyze patterns in data. Methods for automated rule generation and for performing predictions are set forth herein which use neural network processing for establishing a transfer function between input data and output data. Rule generation according to methods herein can include querying a trained neural network with datasets. Comments provided by users can be processed using natural language processing and examined to provide a crowdsourced output which can include a prioritized list of topics regarded to be of interest to an aggregation of users. A neural network can be configured using such crowdsourced output or another output provided by running of a comment examination process. Predictions can be provided to one or more destinations and/or user. Predictions provided to different destinations and/or users can be adaptively determined. Embodiments herein accordingly can leverage public perception in configuring a neural network.

Figure 11:
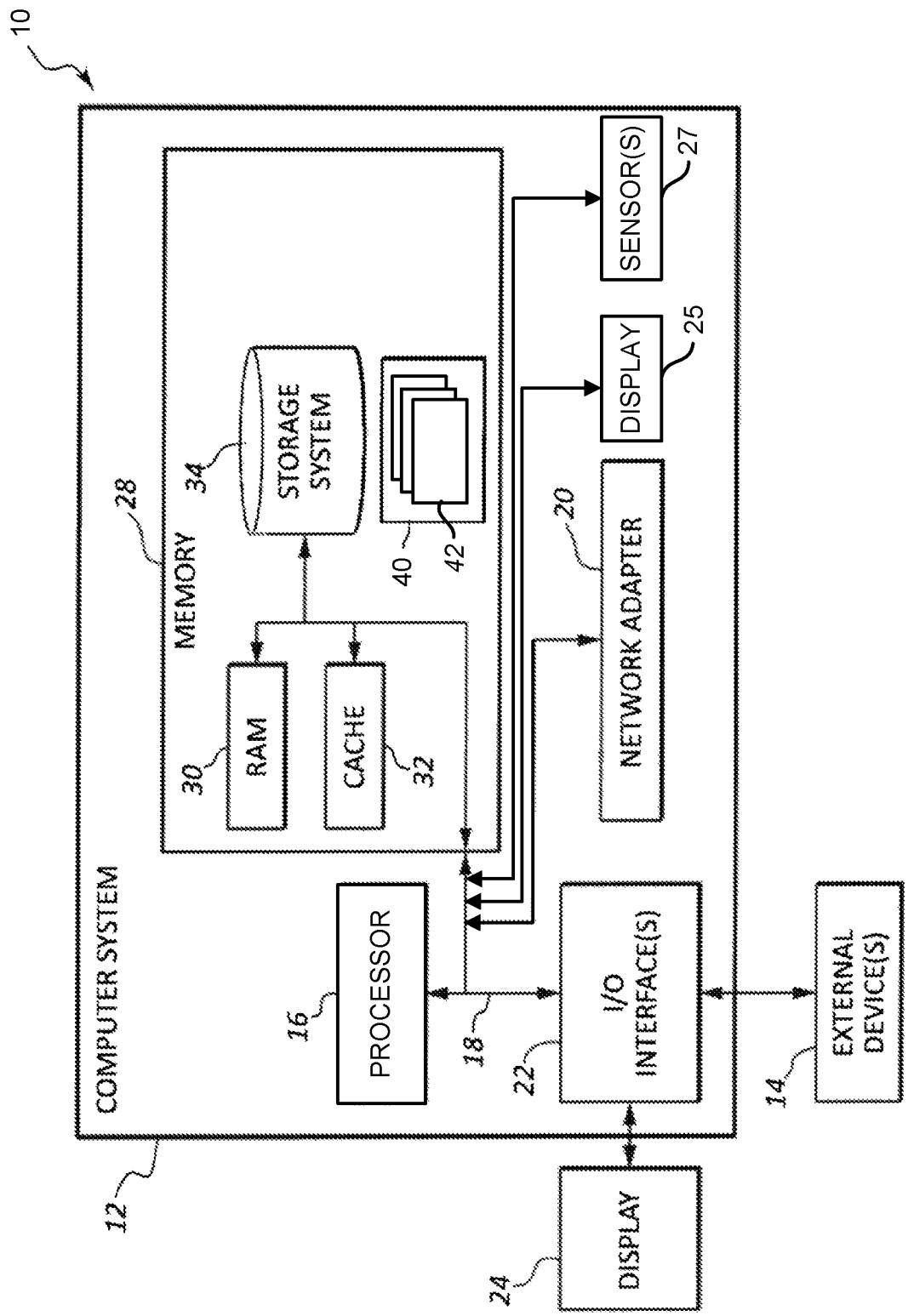
FIG. 11 depicts a computing mode according to one embodiment.
Figure 12:
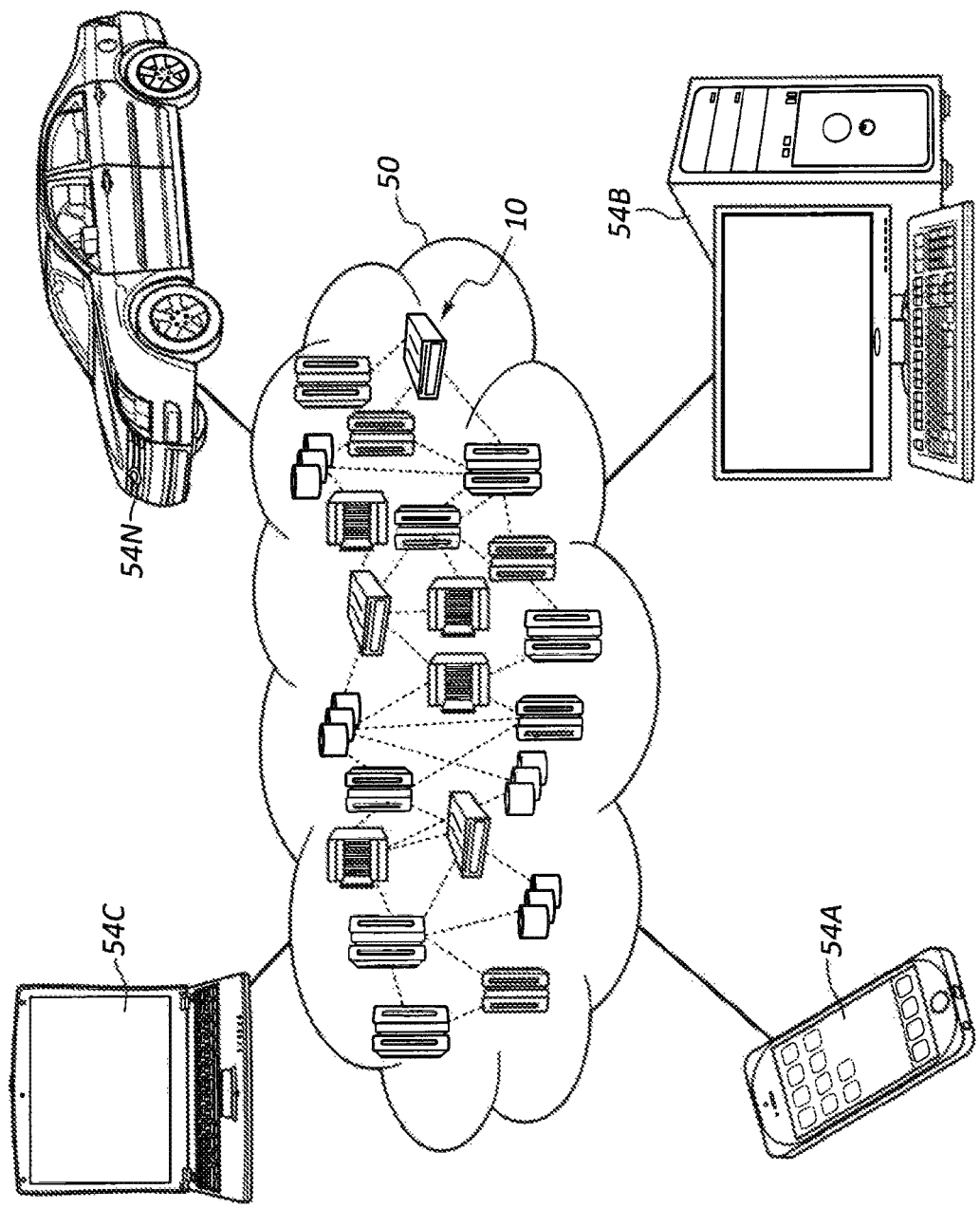
FIG. 12 depicts a cloud computing environment according to one embodiment.
Figure 13:
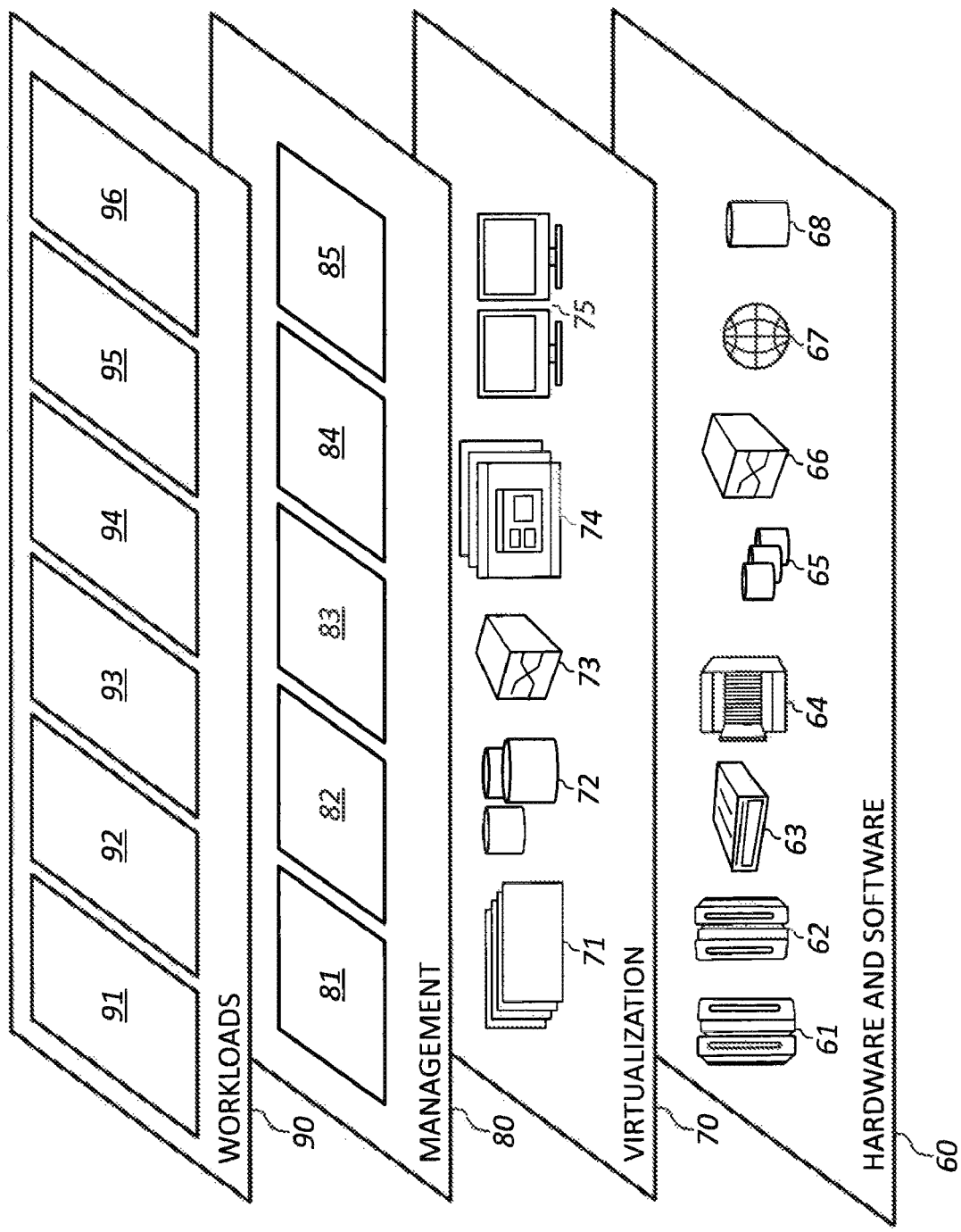
FIG. 13 depicts abstraction model layers according to one embodiment.

FIGS. 11-13 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 11, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 11, computer system 12 in computing node 10 is shown in the form of a general-purpose computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 12-13.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, manager system 110 can include one or more computing node 10 and can include one or more program 40 for performing functions described with reference to method 200 of FIG. 2, for performing functions described with reference to method 500 of FIG. 5, for performing functions described with reference to method 600 of FIG. 6, and the functions described with reference to manager system 110 as set forth in the flowchart of FIG. 7. In one embodiment, social media system 150 can include one or more computing node 10 and can include one or more program 40 for performing functions described with reference to social media system 150 as set forth in the flowchart of FIG. 7. In one embodiment, one or more user computer device 130A-130Z can include one or more computing node 10 and can include one or more program 40 for performing functions described with reference to administrator user computer device 120 as set forth in the flowchart of FIG. 7. In one embodiment, one or more user computer device 130A-130Z can include one or more computing node 10 and can include one or more program 40 for performing functions described with reference to one or more user computer device 130A-130Z as set forth in the flowchart of FIG. 7.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 12 computing node 10 is described as being implemented in a cloud computing environment and accordingly is referred to as a cloud computing node in the context of FIG. 12.

Referring now to FIG. 12, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 12 are intended to be illustrative only and that computing nodes 10 and cloud computing environment 50 can communicate with any type of computerized device over any type of network and/or network addressable connection (e.g., using a web browser).

Referring now to FIG. 13, a set of functional abstraction layers provided by cloud computing environment 50 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for neural network configuring and rules generation as set forth herein. The processing components 96 can be implemented with use of one or more program 40 described in FIG. 11.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A method comprising:
running a comment examining process for processing comments of one or more user to provide a comment processing output;
applying data of a dataset as training data for training a neural network to define a trained neural network, wherein the training data includes input node training data and output node training data; and
generating a decision rule for the dataset based on a transfer function of the trained neural network, wherein the generating includes querying the trained neural network using sample data, wherein the querying is in dependence on one or more topic of interest extracted by the comment examining process.

2. The method of claim 1, wherein the comment processing output includes user profile information of a certain user, and wherein the method includes presenting the decision rule to the certain user.

3. The method of claim 1, wherein the comment processing output is a crowdsourced output, and wherein the method includes configuring the neural network based on the crowdsourced output.

4. The method of claim 1, wherein the comment processing output is a crowdsourced output, wherein the method includes configuring the neural network based on the crowdsourced output, wherein the crowdsourced output includes a prioritized list of comment topics determined using aggregated data of a plurality of users, and wherein the method includes selecting input node parameters for input nodes of the neural network based on the prioritized list.

5. The method of claim 1, wherein the comment processing output includes user profile information that indicates one or more topic of interest to a certain user, wherein the method includes applying a rule generating process for performing the generating based on the one or more topic of interest to the certain user.

6. The method of claim 1, wherein the comment processing output includes a crowdsourced output that indicates one or more topic of interest to an aggregate of users, wherein the method includes applying a rule generating process for performing the generating based on the one or more topic of interest to the aggregate of users.

7. The method of claim 1, wherein the comment processing output includes user profile information that indicates one or more topic of interest to a certain user, wherein the method includes applying a rule generating process for performing the generating based on the one or more topic of interest to the certain user, wherein the rule generating process includes querying the trained neural network using a set of values applied to a certain input node of the neural network, the certain input node being based on the one or more topic of interest.

8. The method of claim 1, wherein the neural network includes a plurality of residual links, wherein the comment processing output includes user profile information that indicates one or more topic of interest to a certain user, wherein the method includes applying a rule generating process for performing the generating based on the one or more topic of interest to the certain user, wherein the rule generating process includes deactivating links of the plurality of residual links based on the one or more topic of interest.

9. The method of claim 1, wherein the method includes selecting input node parameters based on a prioritized list of comment topics determined using aggregated data of a plurality of users.

10. The method of claim 1, wherein the applying data of the dataset as training data for training a neural network to define a trained neural network includes applying the input node training data to an input node of the neural network and applying the output node training data to an output node of the neural network.

11. The method of claim 1, wherein the comments specify actions of one or more individual engaged in an activity, and wherein the comments are comments of one or more user observing the activity.

12. The method of claim 1, wherein the sample data is determined in dependence on one or more topic of interest extracted by the comment examining process.

13. The method of claim 1, wherein the generating the decision rule for the dataset based on the transfer function of the trained neural network includes querying the trained neural network using a set of values to determine a characteristic of the transfer function, wherein the set of values is determined in dependence on one or more topic of interest extracted from the processing comments by the comment examining process.

14. The method of claim 1 wherein the generating the decision rule for the dataset based on the transfer function of the trained neural network includes querying the trained neural network using a spread of values to determine a characteristic of the transfer function, wherein the spread of values is determined in dependence on one or more topic of interest extracted by the comment examining process.

15. The method of claim 1, wherein the comment processing output includes a crowdsourced output that indicates one or more topic of interest to an aggregate of users, wherein the generating the decision rule for the dataset based on the transfer function of the trained neural network includes querying the trained neural network using a set of values to determine a characteristic of the transfer function, wherein the set of values is determined in dependence on the one or more topic of interest to an aggregate of users extracted from the processing comments by the comment examining process.

16. A method comprising:
running a comment examining process for processing comments of one or more user to provide a comment processing output;
configuring a neural network based on the comment processing output, wherein training data for training the neural network to define a trained neural network includes input node training data and output node training data; and
predicting a result of an event using the trained neural network, wherein the comment processing output is a crowdsourced output, wherein the method includes configuring the neural network based on the crowdsourced output, wherein the crowdsourced output includes a prioritized list of comment topics determined using aggregated data of a plurality of users, and wherein the method includes selecting input node parameters for input nodes of the neural network based on the prioritized list.

17. The method of claim 16, wherein the comment processing output is a crowdsourced output, and wherein the method includes configuring the neural network based on the crowdsourced output.

18. The method of claim 16, wherein the comment processing output is a crowdsourced output, wherein the method includes configuring the neural network based on the crowdsourced output, wherein the crowdsourced output includes a prioritized list of comment topics determined using aggregated data of a plurality of users, and wherein the method includes selecting input node parameters for input nodes of the neural network based on the prioritized list.

19. The method of claim 16, wherein the trained neural network includes a plurality of residual links subject to being deactivated, wherein the predicting includes performing first predicting for sending a first prediction to a first destination and performing second predicting for sending a second prediction to a second destination, wherein performing the first predicting includes deactivating first links of the plurality of residual links, wherein performing the second predicting includes deactivating second links of the plurality of residual links.

20. The method of claim 16, wherein the comments specify actions of one or more individual engaged in an activity, and wherein the comments are comments of one or more user observing the activity.

21. A method comprising:
running a comment examining process for processing comments of one or more user to provide a comment processing output;
applying data of a dataset as training data for training a neural network to define a trained neural network, wherein the training data includes input node training data and output node training data; and
generating a decision rule for the dataset based on a transfer function of the trained neural network, wherein the decision rule is based on the comment processing output, wherein the comment processing output includes user profile information that indicates one or more topic of interest to a certain user, wherein the method includes applying a rule generating process for performing the generating based on the one or more topic of interest to the certain user, wherein the rule generating process includes querying the trained neural network using a set of values applied to a certain input node of the neural network, the certain input node being based on the one or more topic of interest.

* * * * *